United States Patent
Itoh et al.

[11] Patent Number: 5,808,754
[45] Date of Patent: Sep. 15, 1998

[54] FACSIMILE MACHINE WITH PLURAL RECEPTION MODES

[75] Inventors: Shingo Itoh, Komaki; Suzuyo Murai, Nagoya, both of Japan

[73] Assignee: Brother Kogyo Kabushiki Kaisha, Nagoya, Japan

[21] Appl. No.: 546,137

[22] Filed: Oct. 20, 1995

[30]     Foreign Application Priority Data

Oct. 24, 1994  [JP]  Japan .................................. 6-258066
Nov. 17, 1994  [JP]  Japan .................................. 6-283678

[51] Int. Cl.⁶ ..................................................... H04N 1/00
[52] U.S. Cl. .......................... 358/440; 358/400; 358/442; 358/444; 358/468; 379/100
[58] Field of Search .................................. 358/400, 402, 358/407, 404, 434, 435, 436, 438, 439, 440, 442, 444, 468; 379/100; H04N 1/00

[56]              References Cited

U.S. PATENT DOCUMENTS

| | | | |
|---|---|---|---|
| 5,103,318 | 4/1992 | Takaoka .................................. | 358/404 |
| 5,216,517 | 6/1993 | Kinoshita et al. ...................... | 358/440 |
| 5,239,385 | 8/1993 | Ejiri ......................................... | 358/440 |
| 5,239,576 | 8/1993 | Yoshida et al. ......................... | 358/440 |
| 5,247,370 | 9/1993 | Takaoka .................................. | 358/440 |
| 5,274,467 | 12/1993 | Takehiro et al. ........................ | 358/440 |
| 5,287,199 | 2/1994 | Zoccolillo ............................... | 358/400 |
| 5,287,402 | 2/1994 | Nakajima ................................ | 379/100 |
| 5,289,530 | 2/1994 | Reese ...................................... | 379/88 |
| 5,291,546 | 3/1994 | Giler et al. .............................. | 379/100 |
| 5,301,035 | 4/1994 | Hayafune ................................ | 358/440 |
| 5,307,178 | 4/1994 | Yoneda ................................... | 358/440 |
| 5,307,179 | 4/1994 | Yoshida ................................... | 358/440 |
| 5,337,350 | 8/1994 | Kuwahara ............................... | 379/100 |
| 5,379,124 | 1/1995 | Ikegaya et al. ......................... | 358/440 |
| 5,448,626 | 9/1995 | Kajiya et al. ........................... | 379/100 |
| 5,517,557 | 5/1996 | Tanaka .................................... | 379/100 |
| 5,552,897 | 9/1996 | Mandelbaum et al. ................ | 358/400 |

*Primary Examiner*—Thomas L. Stoll
*Attorney, Agent, or Firm*—Oliff & Berridge, PLC

[57]              ABSTRACT

When a call signal is received, the caller's telephone number transmitted from the switchboard is stored in the RAM. Then, whether the caller's telephone number matches one of telephone numbers stored in the abbreviated-dialing list is determined in S29. When the caller's telephone number matches one telephone number stored in that list (Yes in S29), the attribute stored in correspondence with the caller's telephone number is judged in S31. Then, a reception mode suited for the determined attribute is selected and set to the facsimile machine 1 in S34, S36, or S38. Afterward, a reception operation of the set mode is performed in S35, S37, or S39. At this stage, the telephone circuit is first connected.

18 Claims, 11 Drawing Sheets

FACSIMILE MACHINE WITH PLURAL RECEPTION MODES

BACKGROUND OF THE INVENTION

1. Field of the Invention

The present invention relates to a facsimile machine capable of receiving, in a plurality of reception modes, various messages transmitted from a remote facsimile machine.

2. Description of the Related Art

There has been known a facsimile machine that uses the same telephone circuit for transmission and reception of both telephone and facsimile messages. The facsimile machine has a mode, referred to as an F/T mode hereinafter, for switching between facsimile and telephone functions. When in the F/T mode, the facsimile machine determines whether an incoming call is a facsimile or telephone message, then selects and executes either facsimile or telephone reception processes accordingly.

When the facsimile machine is in the F/T mode, its telephone circuit is closed or brought into connection by arrival of an incoming call signal. Then, the facsimile machine begins transmission and reception of predetermined signals according to predetermined procedures for controlling transmissions. The facsimile machine generates a mock-ringing tone to summon the user of the facsimile machine. At the same time, the facsimile machine transmits a mock-ringing back tone over the connected telephone circuit to indicate to the caller that the facsimile machine is summoning its user. If during this time the facsimile machine receives transmission of a CNG signal, which is a call tone signal indicating that the incoming message is a facsimile transmission, then the facsimile machine executes facsimile reception processes. On the other hand, telephone reception processes are executed if the handset of the facsimile machine is picked up. If no CNG signal is received, and if no one picks up the handset, for a predetermined duration of time, then the facsimile machine executes facsimile reception processes to compel the caller to give up his or her attempt at transmission, even if the caller was attempting to transmit a telephone message.

To determine whether or not a CNG signal has been received, a conventional facsimile machine set to the F/T mode uses the predetermined transmission control procedures, which require that the telephone circuit be connected after the call signal arrives. Because the circuit must be connected to make this determination, the caller will be charged for the phone call even when communication is impossible.

For example, after the circuit is connected, the conventional facsimile machine will transmit to the caller a voice message that says, for example, "Now ringing. Please hold on." Then, the facsimile machine generates a mock-ringing signal to summon the user of the facsimile machine. The facsimile machine also transmits a mock-ring back tone back to the caller. However, even if no one is nearby to hear the mock-ringing signal, the facsimile machine will continue to produce the mock-ringing signal for a predetermined duration of time, during which time the caller is forced to wait. After the predetermined duration of time passes, the facsimile machine will start processes for receiving incoming facsimile messages, which will discourage the caller into giving up on this transmission attempt and terminating the telephone call. In this case, the caller will be charged for the telephone call, even though he or she was unable to communicate with the other party.

There has also been known a facsimile machine that can be connected to a personal computer. The facsimile machine selectively sets either of two reception modes: a personal computer reception mode, wherein image information transmitted from a remote facsimile machine is received by the facsimile machine and then transferred to the personal computer; and a present-device reception mode, wherein image information is received and printed by the facsimile machine itself.

When the present-device reception mode is selected and set, first the facsimile machine temporarily stores incoming coded image data into a buffer. Then a decoding portion decodes the coded image data. The decoded image data is developed into bit image data for recording in single-page units and written into an image memory. The bit image data is then outputted to a printer portion and printed on a sheet thereat.

When the personal computer reception mode is selected and set, on the other hand, the facsimile machine also temporarily stores incoming coded image data into a buffer. Then, the facsimile machine transmits the coded image data to the personal computer via an input/output port, where it is decoded and stored in a random access memory (RAM). Afterward, an operator selects an appropriate application software of the personal computer to process the image data or display it on a display so that a desired portion of image data can be printed.

However, the operator must frequently operate the reception mode setting key when he or she desires incoming messages from different sources in different forms. For example, when the operator desires to use incoming image information as image data to prepare diagrams, he or she must operate the reception mode setting key to set the facsimile machine to the personal-computer reception mode. Similarly, the operator must set the facsimile machine to the present-device reception mode when incoming image information is to be immediately outputted in hard copy form.

If the user forgets to set the facsimile machine to a desired reception mode, then incoming data will be received in some form other than the form desired. For example, when the facsimile machine is set to the personal-computer reception mode, then incoming image information will be directed to the personal computer even if the user wanted a hard copy of the incoming image information, as would have been provided were the facsimile machine set to the present-device reception mode. So instead of being immediately outputted on a recording sheet, the user must operate the personal computer to print out the image data using an external printer. On the other hand, received image information will be immediately outputted to the recording sheet when the facsimile machine is in the present-device reception mode, even if the user of the facsimile machine had wanted to process the incoming image information in the personal computer and so had wanted to receive the image information in the personal-computer reception mode. If the image information is to be processed in this case, then it must again be inputted to the personal computer, for example, by being retrieved with an optical scanner.

SUMMARY OF THE INVENTION

It is therefore an objective of the present invention to overcome the above-described problems and provide a facsimile machine that allows a caller to avoid being charged for time necessary to select a telephone reception mode or a facsimile reception mode.

It is another objective of the present invention to provide a facsimile machine wherein an operator need not set the reception mode each time incoming data is to be received in a different reception mode.

In order to attain the above objects and other objects, the present invention provides a facsimile machine for receiving image information transmitted from a remote facsimile machine in a plurality of reception modes, the facsimile machine comprising: means for receiving information on a caller's telephone number of a remote facsimile machine; reception mode setting means for, based on the caller's telephone number, selectively setting a reception mode from a plurality of reception modes; and process execution means for executing reception processes according to the reception mode set by the reception mode setting means.

The telephone information receiving means may preferably receive a signal, indicative of the caller's telephone number, from a switchboard connected to the telephone information receiving means. The telephone information receiving means may preferably include network controlling means for closing a telephone circuit connected to the switchboard after the reception mode setting means sets the reception mode corresponding to the caller's telephone number.

According to another aspect, the present invention provides a facsimile machine capable of receiving a caller's telephone number transmitted, from a switchboard, either directly before transmission of a call signal or between transmission of a first call signal and transmission of a second call signal, the facsimile machine comprising: mode selection means for selecting, based on the caller's telephone number transmitted from the switchboard, one of a telephone reception mode and a facsimile reception mode; and mode execution means for executing reception processes of the selected reception mode.

According to a further aspect, the present invention provides a facsimile machine connected to an external reception device for receiving image information transmitted from a remote facsimile machine and capable of receiving a caller's telephone number transmitted from a switchboard, the facsimile machine comprising: a reception mode setting means for, based on the caller's transmitted from the switchboard, selectively setting a reception mode from a plurality of reception modes including an external reception mode wherein reception is performed at an external reception device and a present-device reception mode wherein reception is performed by the facsimile machine; and a process execution means for executing reception processes according to the reception mode set by the reception mode setting means.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
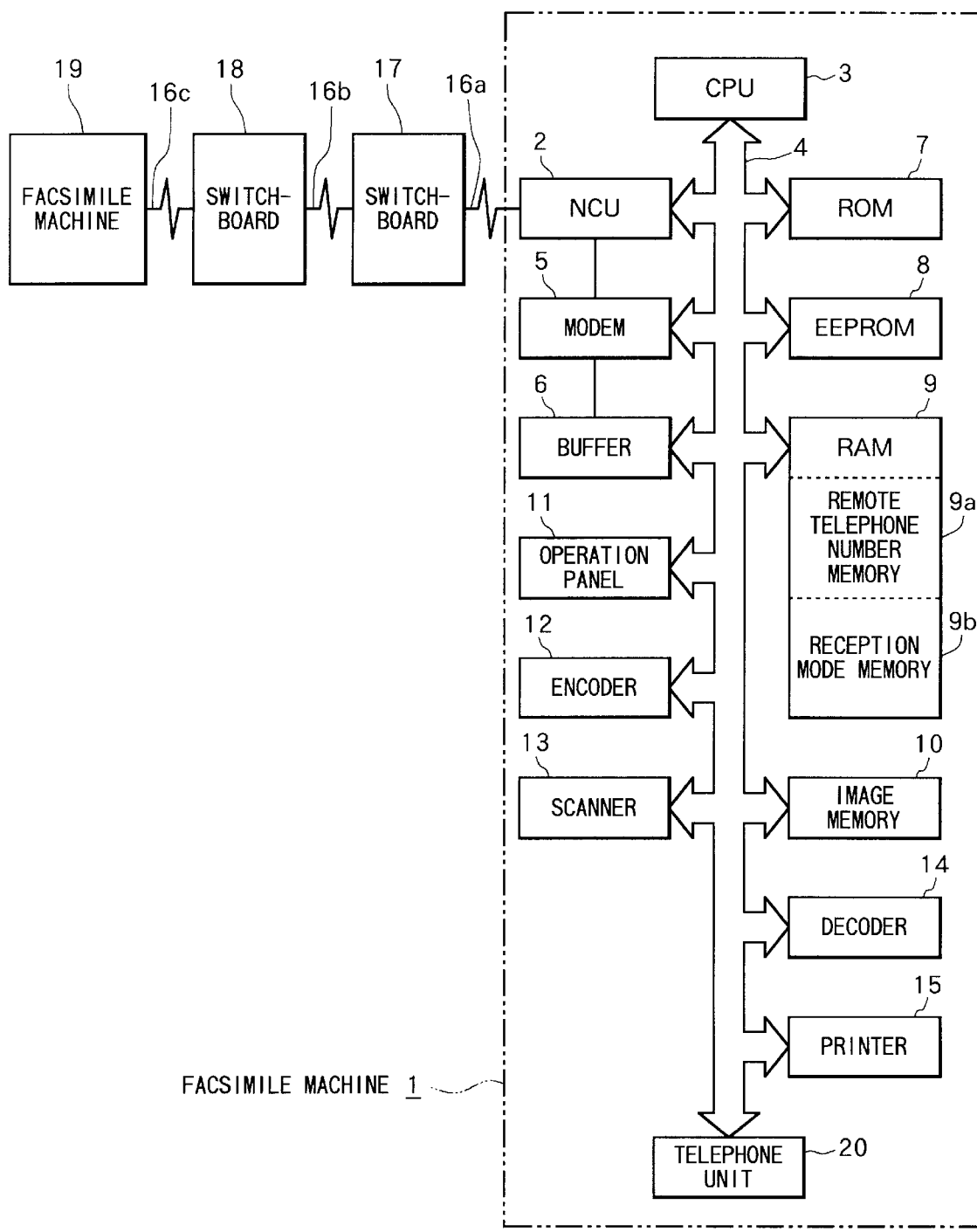
FIG. 1 is a block diagram showing components of a present facsimile machine according to a first embodiment of the present invention and its connections with a remote facsimile machine.

A facsimile machine according to preferred embodiments of the present invention will be described while referring to the accompanying drawings wherein like parts and components are designated by the same reference numerals to avoid duplicating description.

Figure 2:
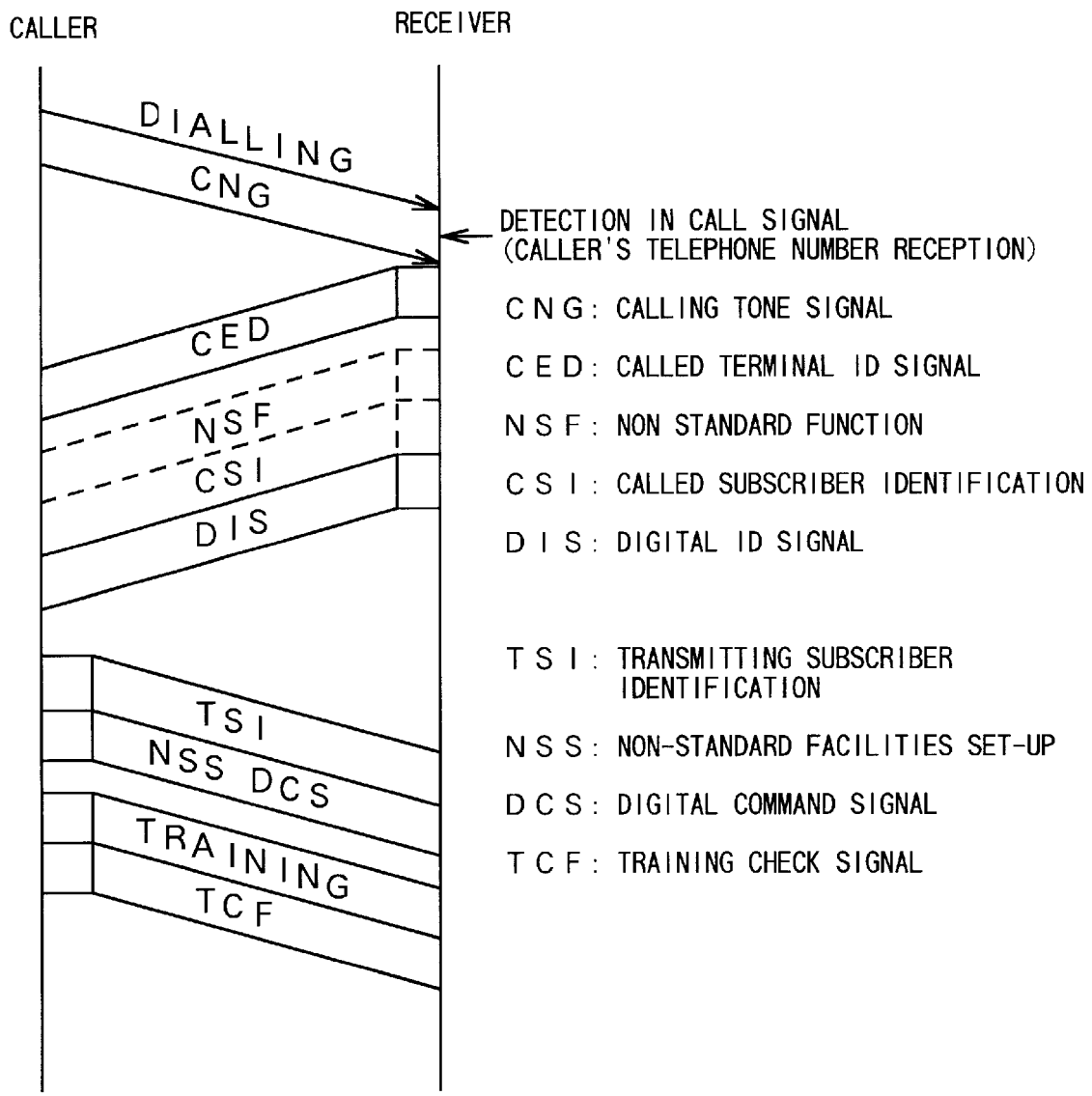
FIG. 2 is a sequence chart schematically showing the manner of transmission and reception of signals according to predetermined procedures for controlling transmission.

A facsimile machine of a first embodiment will be described below with reference to FIGS. 1 through 7. FIG. 1 is a block diagram showing the facsimile machine of the first embodiment. FIG. 2 is an explanatory diagram showing predetermined procedures conducted for controlling transmission.

As shown in FIG. 1, a facsimile machine 1 (referred to as the present facsimile machine 1 hereinafter) is connected to a telephone circuit 16a via a network control unit (NCU) 2, which controls the telephone circuit 16a. The telephone circuit 16a is connected to a present switchboard 17, which serves the area where the present facsimile machine 1 is located. On the other hand, a telephone circuit 16c connects a remote facsimile machine 19 to a remote switchboard 18, which serves the region where the remote facsimile machine 19 is located. A telephone circuit 16b connects the present switchboard 17 to the remote switchboard 18. In the following explanation, the person to receive a facsimile or telephone message using the present facsimile machine 1 will be referred to as the "receiver," and the person attempting to transmit a facsimile or telephone message using the remote facsimile machine 19 will be referred to as the "caller."

When the caller dials the telephone number of the present facsimile machine 1, according to a dialing operation at the remote facsimile machine 19, a call signal will be transmitted via the switchboards 18 and 17 to the present facsimile machine 1. According to the present embodiment, the receiver (i.e., the facsimile machine 1) is registered as a subscriber to a Calling Number Delivery Service at the present switchboard 17. The Calling Number Delivery Service is one of Custom Local Area Signalling System (CLASS) Services which are described in U.S. Pat. No. 5,289,530. According to the Calling Number Delivery Service, during the silent interval between the first call signal and a subsequent call signal, the caller's telephone number is transmitted to the present facsimile machine 1 via the remote switchboard 18 and the present switchboard 17. This Calling Number Delivery Service is an exchange system set up to exchange telephone numbers between callers and receivers. Such an analog exchange system is already in operation in the United States. According to this system, the caller's telephone number may be transmitted to the present facsimile machine 1 immediately before the first call signal, immediately before each call signal, or between each call signal.

A signal bus line 4 connects a CPU 3, which forms the core of the present facsimile machine 1, to other components of the present facsimile machine 1. The other components will be described in the following text. According to predetermined procedures for controlling transmission, the CPU 3 controls each component and executes facsimile operations, that is, data transmission and data reception. In this example, image data is compressed, encoded, and transmitted according to a runlength method between the present facsimile machine 1 and the remote facsimile machine 19.

Although not shown in the drawing, the NCU 2 includes a relay switch connected with the telephone circuit 16a. The CPU 3 controls the NCU 2 by supplying a predetermined signal to the relay switch in the NCU 2. The switch closes in response to the predetermined signal, thereby electrically closing or connecting the telephone circuit 16a. This will properly connect the present facsimile machine 1 to the switchboard 17. As a result, the present facsimile machine 1 can be properly connected to the remote facsimile machine 19 via the telephone circuits 16a, 16b, and 16c and the switchboards 17 and 18. Image information can be transmitted between the facsimile machines 1 and 19 via the telephone circuits. The CPU 3 can further control the NCU 2 by supplying another predetermined signal to the relay switch. The switch opens in response to the predetermined signal, thereby electrically opening or disconnecting the telephone circuit 16a.

A modem 5 is provided for modulating image information for transmission, demodulating image information of incoming signals, and transmitting and receiving various types of procedure signals for transmission and reception of image information. A buffer 6 is provided for temporarily storing data, including image information encoded in the format (runlength format) which has been transmitted from the remote facsimile machine 19 and which is to be transmitted to the remote facsimile machine 19. A ROM 7 is provided as a memory for storing control programs including the programs shown in FIGS. 3–7 as will be described later. An EEPROM 8 is provided as a memory for storing various setting information. The EEPROM 8 is formed with an abbreviated-dialing list as will be described later. A RAM 9 is provided as a memory for temporarily storing various types of data while operations are being performed. The RAM 9 includes a remote telephone number memory 9a for storing the telephone numbers of remote telephones and remote facsimile machines and a reception mode memory 9b for storing the reception mode to which the present facsimile machine 1 is set. An image memory 10 such as a dynamic RAM (DRAM) is provided as a memory for storing image data and bit images for recording.

An operation panel 11 is provided for displaying, on a display, the operation status of the present facsimile machine 1 and also for an operator to manipulate to perform various operations. Although not shown in the drawings, the operation panel 11 includes a numeric pad, function keys, a reception mode setting key, and an abbreviated-dialing registration key. The reception mode setting key is a key for selecting one of three reception modes: a telephone reception mode, a facsimile reception mode, and a facsimile-telephone reception mode. When in the facsimile-telephone reception mode, which will be referred to as the F/T reception mode hereinafter, the present facsimile machine 1 selects either the telephone or the facsimile modes. The mode set by the reception mode setting key is stored in the reception mode memory 9b.

An encoding portion 12 is provided for encoding image information into a format suitable for transmission. A scanner 13 is provided for retrieving images from documents to be facsimile transmitted. A decoding portion 14 is provided for, when recording is to be performed, retrieving and decoding image data that was transmitted from a remote facsimile machine and then stored in the image memory 10. A printer 15 is provided for recording the image data on a sheet. The printer 15 could be a laser printer for electrostatic-electrophotographically forming toner images on a sheet by first using laser light to form a latent image on a photosensitive drum, using toner to develop the latent image into a visual image, and then transferring the toner image onto the sheet. The telephone unit 20 includes a handset, which is not shown in the drawings. The handset has a speaker and a mike. The telephone unit 20 outputs, from the speaker, incoming voice data and transmits voice data inputted through the mike.

With the above-described structure, facsimile reception operations are conducted through predetermined transmission controlling procedures as shown in FIG. 2. According to a dialing operation by the caller at the remote facsimile machine 19, a call signal is transmitted from the switchboard 17 to the present facsimile machine 1, whereupon a reception routine is started as will be described later with reference to FIG. 4. Afterward, a caller's telephone number is transmitted from the switchboard 17 to the present facsimile machine 1. At this stage, a reception mode is selected and set based on the caller's telephone number. If the telephone mode is set, as will be described later with reference to FIG. 5, the NCU 2 is controlled to close or connect the telephone circuit 16a, only after the handset of the telephone unit 20 is picked up, thereby properly connecting the telephone line between the present facsimile machine 1 and the remote facsimile machine 19.

On the other hand, if the reception mode is set to the facsimile reception mode or the F/T mode, as will be described later with reference to FIGS. 6 and 7, the NCU 2 is immediately controlled to close or connect the telephone circuit 16a to properly connect the telephone line between the present facsimile machine 1 and the remote facsimile machine 19. As a result, signals can be exchanged according to predetermined procedures performed, in the CPUs of both the facsimile machines 1 and 19, for controlling transmission. The predetermined transmission controlling procedures mainly include: procedures performed before image information is transmitted; procedures essential for transmitting the image information; procedures performed after the image information has been transmitted; and call-reinstatement procedures. The procedures, performed before transmission of image information, include: transmission and reception of CNG signals indicating that the incoming message is a facsimile transmission; transmission and reception of digital identification signals (DIS) and TSI signals for distinguishing between functions available at the terminals, commanding desired modes, and confirming that reception is possible in the present mode. Examples of signals exchanged according to these procedures are shown in FIG. 2. Through the predetermined procedures, image information is properly transmitted from the remote facsimile machine 19 to the present facsimile machine 1. The transmitted image information is then stored in the image memory 10 as image data.

It is noted that there are two kinds of facsimile reception operations: normal operation for performing a recording operation in real-time with reception; and an interception operation for performing a recording operation at a later time.

During the normal reception operation, the image data, which is in a coded (compressed) condition when received by the present facsimile machine 1 to be stored in the image memory 10, is first decoded in the decoding portion 14 and then developed into bit image data for printing in single-page units and again stored in the image memory 10. The bit image data is transmitted to the printer portion 15, where printing is performed for one page's worth of the bit image data.

During interception, on the other hand, recording is not performed in real-time with the reception. The compressed data is stored in a portion of the image memory 10 until recording is performed later. During recording operation, bit development is performed in the remaining regions of the image memory 10 at the same resolution as mentioned above for bit development during normal reception.

The facsimile machine 1 can also transmit image information to remote facsimile machines as described below. The facsimile machine 1 can achieve two kinds of transmission operations: normal transmission operation; and memory transmission operation. In the normal transmission operation, the document to be transmitted is first retrieved using the scanner 13. The retrieved image data is encoded at the encoding portion 12 and transmitted to the remote facsimile machine 19. If the present facsimile machine 1 is set to the memory transmission, the retrieved and encoded image data is stored in the image memory 10 until a designated later time when it is transmitted to the remote facsimile machine 19.

Next, an explanation of processes followed by the present facsimile machine 1 will be described below in greater detail, with reference to FIGS. 3 through 7. Individual steps in the flowcharts of these drawings will be represented as Si, wherein i is the number of the step (i.e., i=11, 13, 15, ... i).

According to the present embodiment, the operator of the present facsimile machine 1 registers, for abbreviated dialing, his or her known telephone numbers of remote facsimile machines. This abbreviated dialing registration routine will be first described below with reference to the flowchart in FIG. 3.

Figure 3:
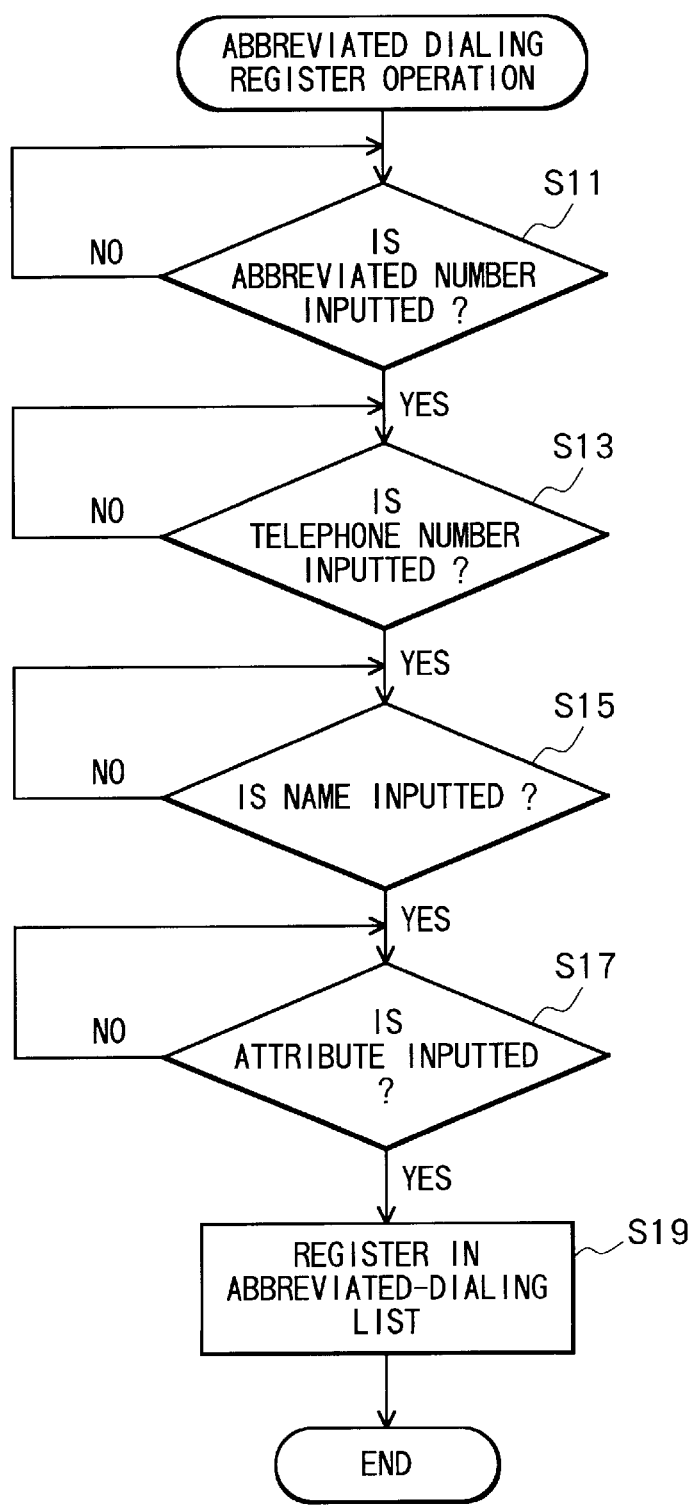
FIG. 3 is a flowchart showing an abbreviated-dialing registration routine performed in the present facsimile machine.

The routine represented by the flowchart in FIG. 3 is started when the abbreviated-dialing registration key on the operation panel 11 is operated. First, whether or not an abbreviated-dialing number (for example, from 001 to 200), representative of a telephone number of a remote facsimile machine desired to be registered, has been entered using the numeric pad is determined (S11). Once an abbreviated-dialing number is entered (S11:YES), then whether or not the corresponding telephone number has been entered using the numeric pad is determined (S13). Once a telephone number is entered (S13:YES), then whether or not a name that corresponds to the entered telephone number has been entered is determined (S15). Once a name is entered (S15:YES), then whether or not an attribute has been inputted for the telephone number is determined (S17). An attribute indicates whether the subject telephone number is used only for transmission of telephone messages, only for transmission of facsimile messages, or for transmission of both telephone messages and facsimile messages. In other words, the attribute indicates whether a message transmitted from the subject telephone number should be received by either one of the three reception modes: telephone mode; facsimile mode; and F/T mode. The operator determines which of the three attributes is most appropriate for the subject telephone number based on his or her experiences with transmissions from the subject telephone number. For example, when a user of the subject telephone number usually transmits telephone messages to the present facsimile machine 1, then the attribute should be set to indicate that the subject telephone number is for the telephone messages only. When the user of the subject telephone number usually transmits both facsimile messages and telephone messages, then the attribute should be set to indicate that the subject telephone number is for both facsimile messages and telephone messages.

Once the attribute for the telephone number is entered (S17:YES), then the telephone number, the name, and the attribute are stored, in correspondence with the abbreviation-dialing number, in the abbreviated-dialing list provided in a predetermined region of the EEPROM 8 (S19). Then, the abbreviated-dialing registration routine is completed.

Figure 4:
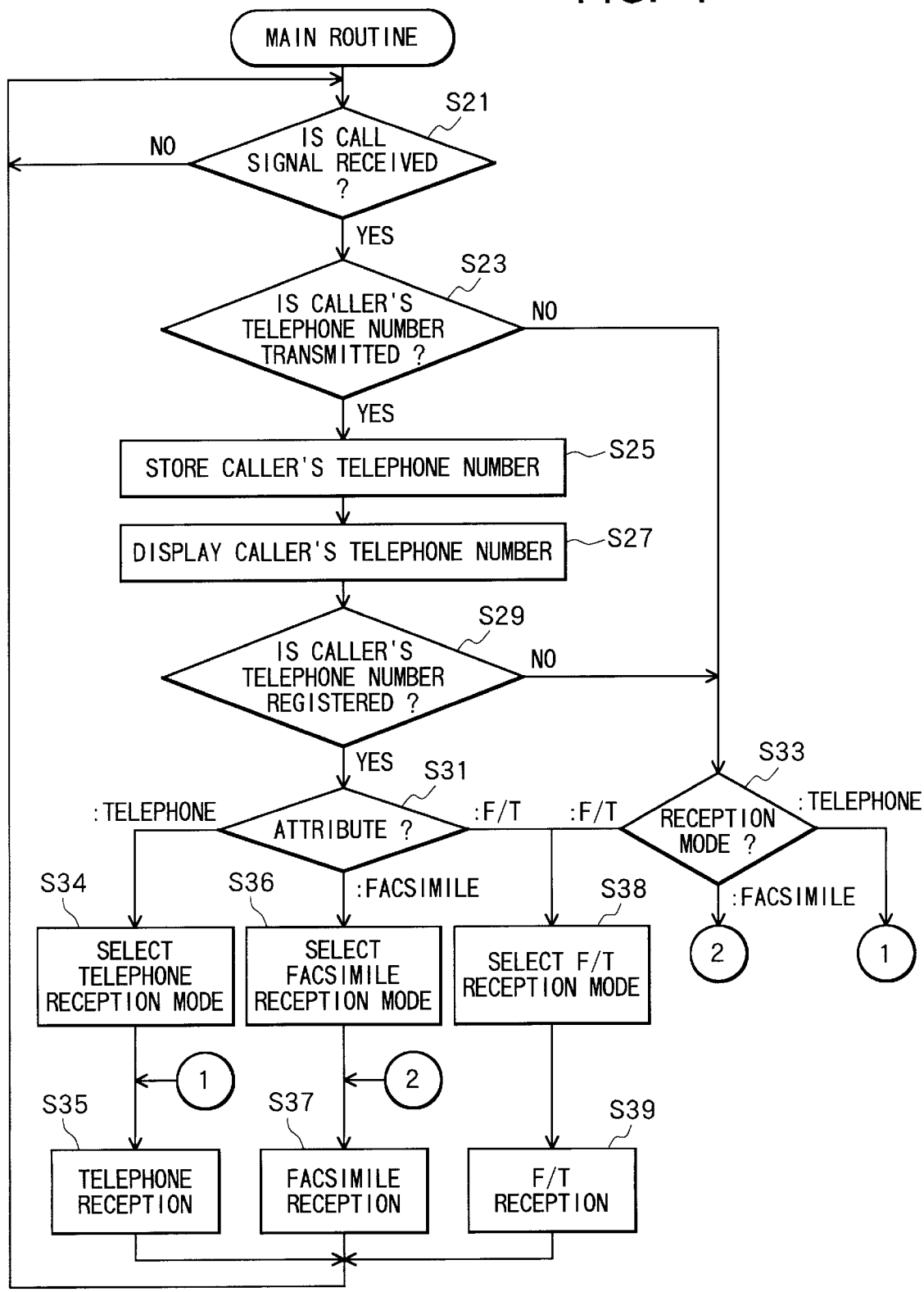
FIG. 4 is a flowchart showing a reception mode routine performed in the present facsimile machine.

Next, an explanation of a reception routine performed by the present facsimile machine 1 will be provided while referring to the flowchart in FIG. 4. The program starts when the power is turned on and the present facsimile machine 1 is put into a condition where it is capable of receiving incoming messages.

First, whether or not a call signal has been received is determined (S21). Once a call signal is received (S21:YES), then whether or not the caller's telephone number has been transmitted over the present switchboard 17 is determined (S23). If not (S23:NO), for example, when the user of the remote facsimile machine 19 prefers to keep his or her telephone number confidential, then processes are performed according to a reception mode, stored in the reception mode memory 9b, which has been previously set by the operator's manipulation of the reception mode setting key (S33).

On the other hand, when the caller's telephone number is transmitted (S23:YES), it is temporarily stored in the caller's telephone number memory 9a of the RAM 9 (S25). Then the caller's telephone number is displayed on the display of the operation panel 11 (S27). Next, whether or not the caller's telephone number has been registered in the abbreviated-dialing list is determined (S29). If not (S29:NO), then processes are performed according to the reception mode, stored in the reception mode memory 9b, which has been previously set by the reception mode setting key (S33). On the other hand, if the telephone number has been registered in the abbreviated-dialing list (S29:YES), then the abbreviated-dialing list is searched to find the attribute stored in correspondence with the caller's telephone number (S31).

If the attribute indicates that the caller's telephone number is for telephone messages only, then the telephone reception mode is selected (S34). This sets the present facsimile machine 1 to the telephone reception mode. Next, processes shown in FIG. 5 for receiving telephone messages are performed (S35). On the other hand, if the attribute indicates that the telephone number is for facsimile messages only, then the facsimile reception mode is selected (S36). This sets the present facsimile machine 1 to the facsimile reception mode. Next, processes shown in FIG. 6 for receiving facsimile messages are performed (S37). Finally, if the attribute indicates that the telephone number is for both telephone and facsimile messages, then the F/T reception mode is selected (S38). This sets the present facsimile machine 1 to the F/T reception mode, whereupon processes shown in FIG. 7 for receiving facsimile or telephone messages are performed (S39). After completion of either S35, S37, or S39 the program returns to S21 to again await reception of a call signal.

Figure 5:
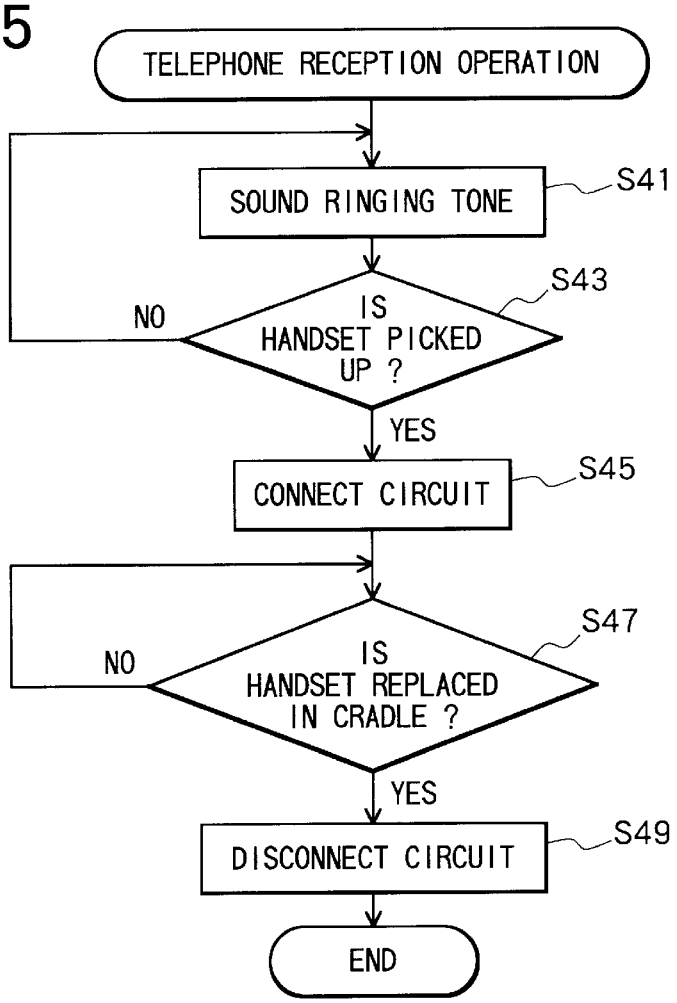
FIG. 5 is a flowchart showing a telephone reception routine of the reception mode routine represented by the flowchart of FIG. 4.

The telephone message reception routine conducted in S35 of the reception routine will be described below while referring to the flowchart shown in FIG. 5.

At the start of the telephone reception routine, first, a ringing tone is sounded at the present facsimile machine 1 (S41). Then, whether or not the telephone unit 20 is brought into off-hook condition is determined (S43). In more concrete terms, whether or not the handset of the telephone unit 20 is picked up is determined. If not (S43:NO), then the ringing tone is again sounded. The telephone circuit 16a will only be closed or connected (S45) once the handset is picked up (S43:YES). In more concrete terms, when the handset is picked up, the CPU 3 controls the NCU 2 to close the telephone circuit 16a to properly connect the facsimile machine 1 to the remote facsimile machine 19. After the telephone circuit is connected, whether or not the telephone unit 20 is brought into on-hook condition is determined (S47). That is, whether or not the handset of the telephone unit 20 is replaced in the cradle is determined. If not (S47:NO), then the telephone circuit 16a is maintained being closed until the handset is replaced in the cradle (S47:YES), whereupon the telephone circuit 16a is opened or disconnected (S49) and the telephone reception routine is completed.

Figure 6:
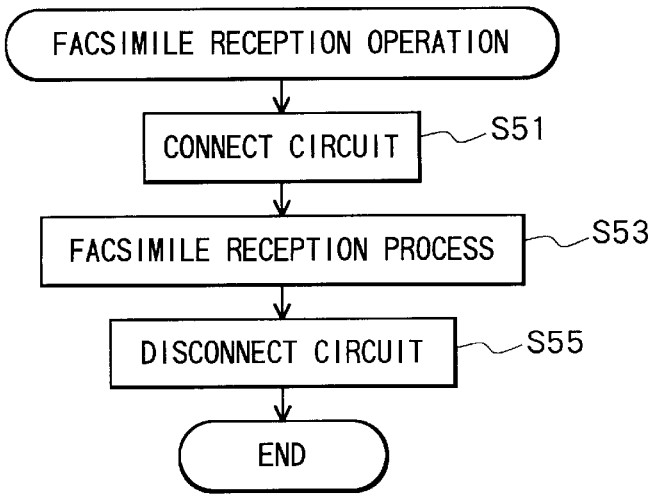
FIG. 6 is a flowchart showing a facsimile reception routine of the reception mode routine represented by the flowchart of FIG. 4.

Next, an explanation of the facsimile message reception routine conducted in S37 of the reception routine will be provided while referring to the flowchart in FIG. 6.

At the start of the facsimile reception routine, first, the telephone circuit 16a is closed or connected (S51). In more concrete terms, the CPU 3 controls the NCU 2 to close the telephone circuit 16a to properly connect the facsimile machine 1 to the remote facsimile machine 19. Then, facsimile reception processes are performed (S53). After the facsimile reception processes are completed, the telephone circuit 16a is opened or disconnected (S55). The facsimile reception processes in S53 are performed according to the predetermined transmission controlling procedures as described already with reference to FIG. 2. The facsimile reception processes may be both the above-described normal reception operations and interception operations.

Figure 7:
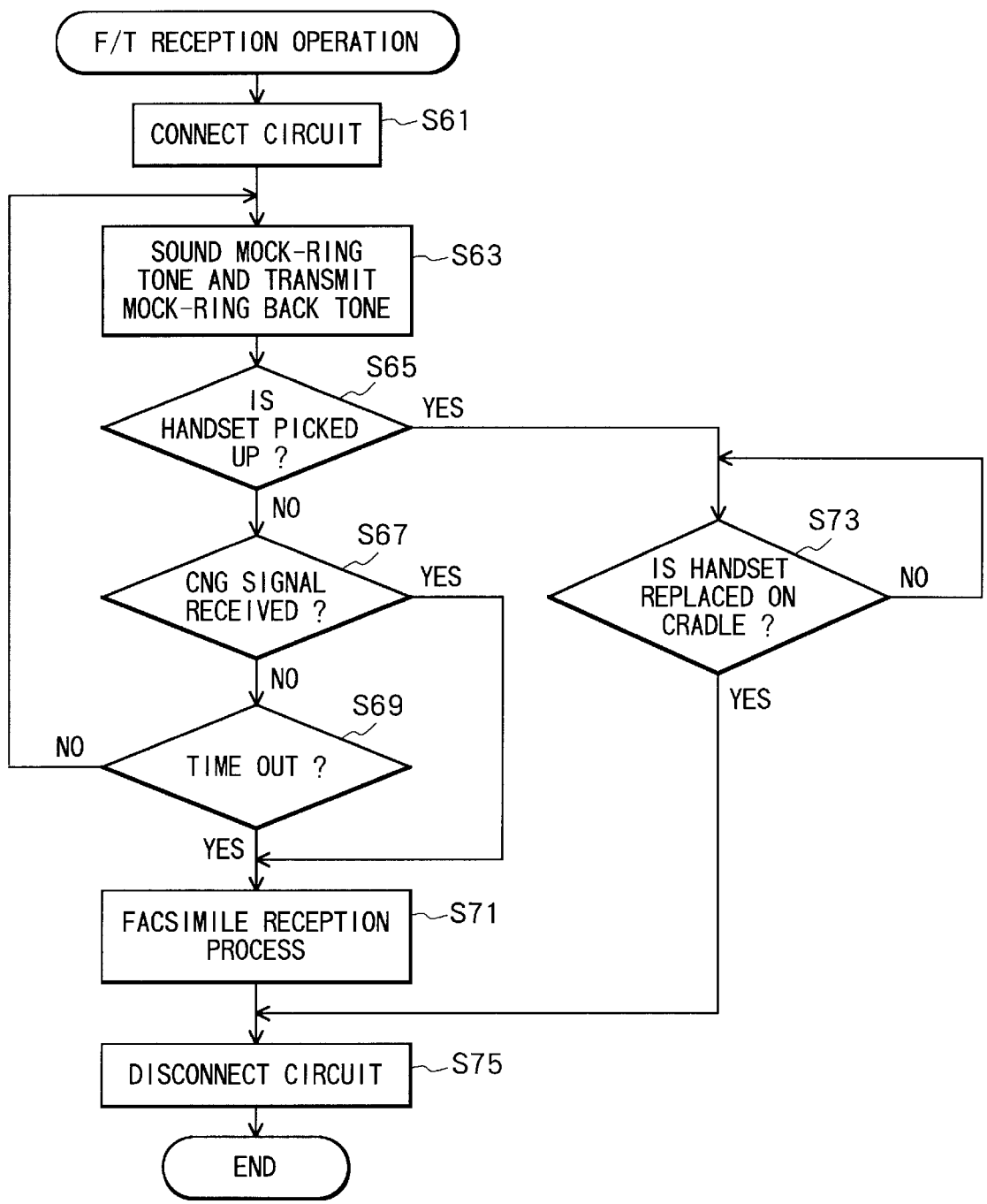
FIG. 7 is a flowchart showing a facsimile telephone reception routine of the reception mode routine represented by the flowchart of FIG. 4.

Next, an explanation of the F/T reception routine conducted in S39 of the reception routine will be provided while referring to the flowchart in FIG. 7.

At the start of the F/T reception routine, first, the telephone circuit 16a is closed or connected (S61). In more concrete terms, the CPU 3 controls the NCU 2 to close the telephone circuit 16a to properly connect the facsimile machine 1 to the remote facsimile machine 19. Then, a mock-ring tone is sounded at the present facsimile machine 1 while a mock-ring back tone is transmitted over the connected telephone circuit to the remote facsimile machine 19 (S63). Next, whether or not the telephone unit 20 is brought into off-hook condition is determined (S65). That is, whether or not the handset of the telephone unit 20 is picked up is determined. If so, (S65:YES), then whether or not the telephone unit 20 is brought into on-hook condition is determined (S73). That is, whether or not the handset is replaced on the cradle is determined. The telephone circuit 16a is kept closed until the handset is replaced on the cradle (S73:YES), whereupon the telephone circuit 16a is opened or disconnected (S75) and the F/T reception routine is completed.

On the other hand, if the handset is not picked up (S65:NO), then whether or not a CNG signal has been received according to the predetermined transmission controlling procedure of FIG. 2 is determined (S67). If so (S67:YES), then the facsimile reception routine is executed (S71). This facsimile reception routine is the same as that of S53 in FIG. 6. Then, the telephone circuit 16a is opened or disconnected (S75) and the F/T reception routine is completed. If no CNG signal has been received so that S67 results in a negative judgement (S67:NO), then whether or not a predetermined duration of time has elapsed since start of this routine is determined (S69). If not (S69:NO), then S63 and on are repeated. If the predetermined duration of time has elapsed (S69:YES), then the facsimile reception routine is executed (S71). Afterwards, the telephone circuit 16a is opened or disconnected (S75) and the F/T reception mode is completed. The facsimile reception mode is executed in S71 because some facsimile machines do not transmit CNG signals.

As described above, in the present embodiment, when a call signal is received, the caller's telephone number transmitted from the switchboard is stored in the RAM. Then, whether the caller's telephone number matches one of telephone numbers stored in the abbreviated-dialing list is determined in S29. When the caller's telephone number matches one telephone number stored in that list (Yes in S29), the attribute stored in correspondence with the caller's telephone number is judged in S31. Then, a reception mode suited for the determined attribute is selected and set to the facsimile machine 1 in S34, S36, or S38. Afterward, a reception operation of the set mode is performed in S35, S37, or S39. At this stage, the NCU 2 first closes or connects the telephone circuit 16a so as to properly connect the facsimile machine 1 to the switchboard 17. As a result, the facsimile machine 1 is properly connected to the remote facsimile machine 19.

Thus, when a caller whose telephone number is registered in the abbreviated-dialing list of the present facsimile machine 1 transmits a message, the registered reception mode is selected, before the telephone circuit is connected, based on the caller's telephone number in the abbreviated-dialing list. Therefore, the caller can avoid being charged for unnecessary telephone charges. For example, if the caller's telephone number is registered in the abbreviated-dialing list, and its attribute is determined to be for telephone messages only, then the telephone reception mode is selected for the present facsimile machine 1. Because the telephone reception mode is selected before the telephone circuit has been connected, the caller can avoid being charged for the time required to select the telephone reception mode.

In the same manner, if the caller's telephone number is registered in the abbreviated-dialing list, and its attribute is determined to be for facsimile messages only, then the facsimile reception mode is selected. Because the facsimile reception mode is selected before the telephone circuit has been connected, the caller can avoid being charged for the time required to select the facsimile reception mode.

The benefits of the present embodiment are particularly striking when a caller attempts to transmit a telephone message while the present facsimile machine 1 has been set to the F/T reception mode through the reception mode setting key. Conventionally, the caller would be charged for the time during which the mock-ring tone is transmitted. However, with the present invention, the reception mode is selected by giving precedence, over the reception mode previously set to the present facsimile machine 1 by the reception mode setting key, to the reception mode indicated by the attribute of the telephone number registered in the abbreviated-dialing list. Therefore, when the caller's telephone number is registered with an attribute indicating that the telephone number is for telephone messages only, then the caller will not be charged for the long waiting period between when the ring tone is sounded and either the user answers the telephone or the predetermined duration of time elapses.

According to the present embodiment, as described above, a caller can avoid being charged for time required for selecting either the telephone reception mode or the facsimile reception mode. This contrasts with conventional facsimile machines, wherein either the telephone reception mode or the facsimile reception mode is selected based on a signal obtained during the predetermined transmission controlling procedures and the caller is charged for the time required to make the selection.

According to the present embodiment, based on the caller's telephone number received by the facsimile machine, the facsimile machine can determine that the caller is attempting to transmit a telephone message and therefore set itself to the telephone reception mode accordingly, before the telephone circuit is connected. The caller will not be charged for the time required to set the facsimile machine to the telephone reception mode. Further, the facsimile machine can determine whether the caller is attempting to transmit a facsimile message, and therefore set itself to the facsimile reception mode accordingly, based on the caller's telephone number received by the facsimile machine, before the telephone circuit is connected. The caller will not be charged for the time required to set the facsimile machine to the facsimile reception mode.

Next, a facsimile machine according to a second embodiment of the present invention will be described with reference to FIGS. 8 through 12.

The facsimile machine of the present embodiment is connected to an external reception device. Upon receiving image information from a remote facsimile machine, the present facsimile machine can transfer the image information to the external reception device.

Figure 8:
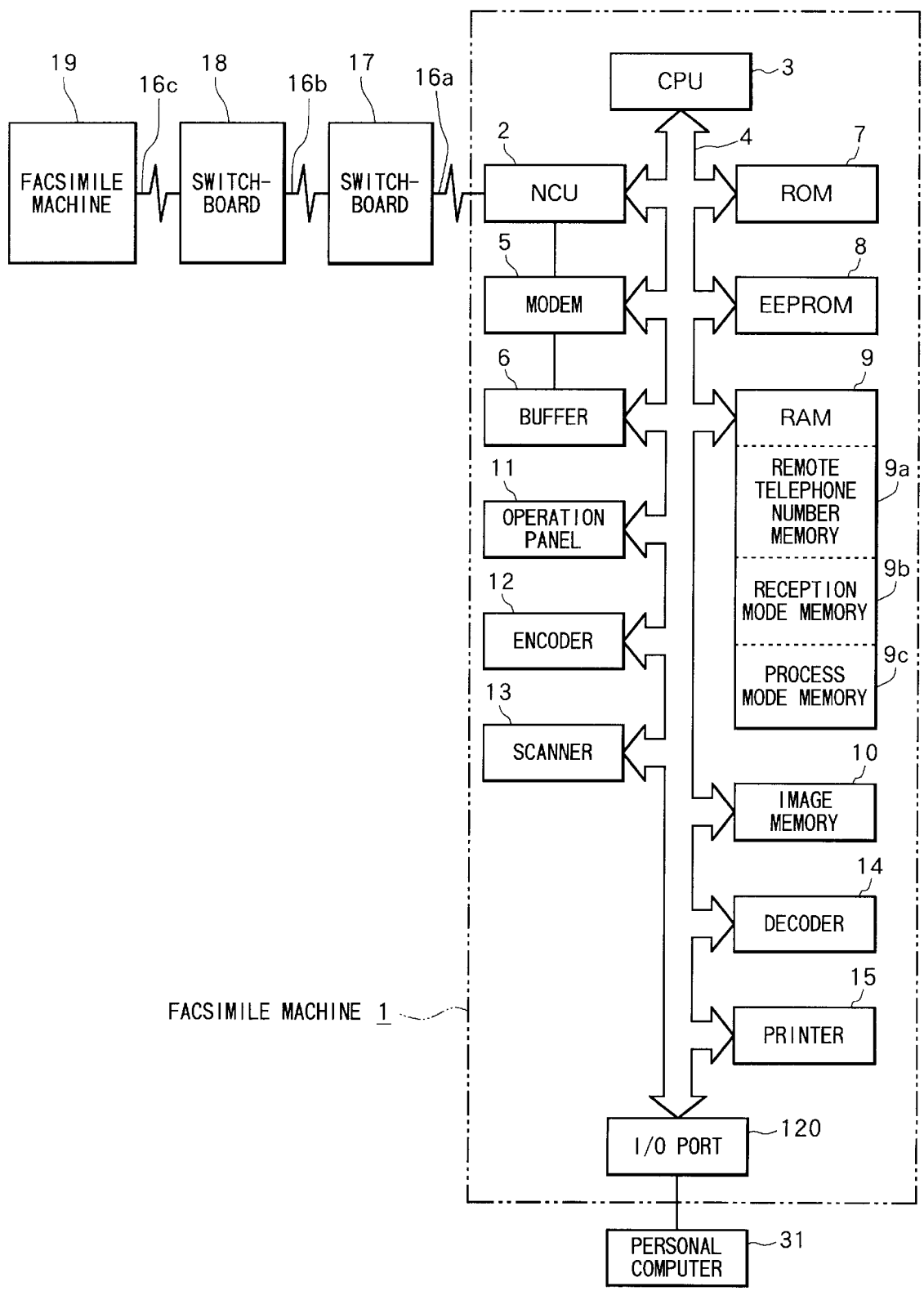
FIG. 8 is a block diagram showing components of a present facsimile machine according to a second embodiment of the present invention and its connections with a remote facsimile machine.

The facsimile machine 1 of the second embodiment is similar to that of the first embodiment, except that, as shown in FIG. 8, the facsimile machine 1 is not provided with the telephone unit 20, but is provided with an input-output port 120, which is capable of inputting and outputting signals to and from an external equipment. In this example, the input-output port 120 is connected to a personal computer 31 (external equipment), which will be described later. Also, the RAM 9 is further provided with a process mode memory 9c.

Figure 10:
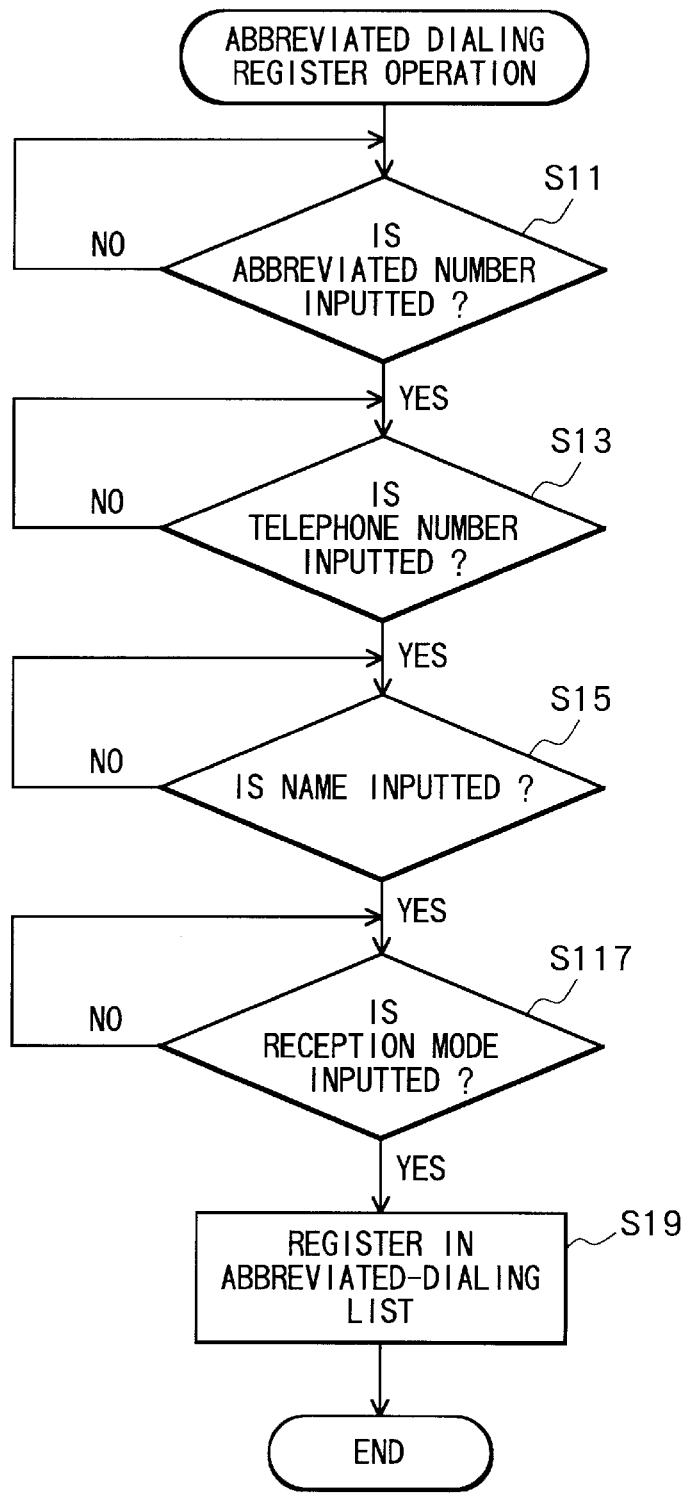
FIG. 10 is a flowchart showing the abbreviated-dialing registration routine of FIG. 3 modified according to a second embodiment of the present invention.
Figure 11:
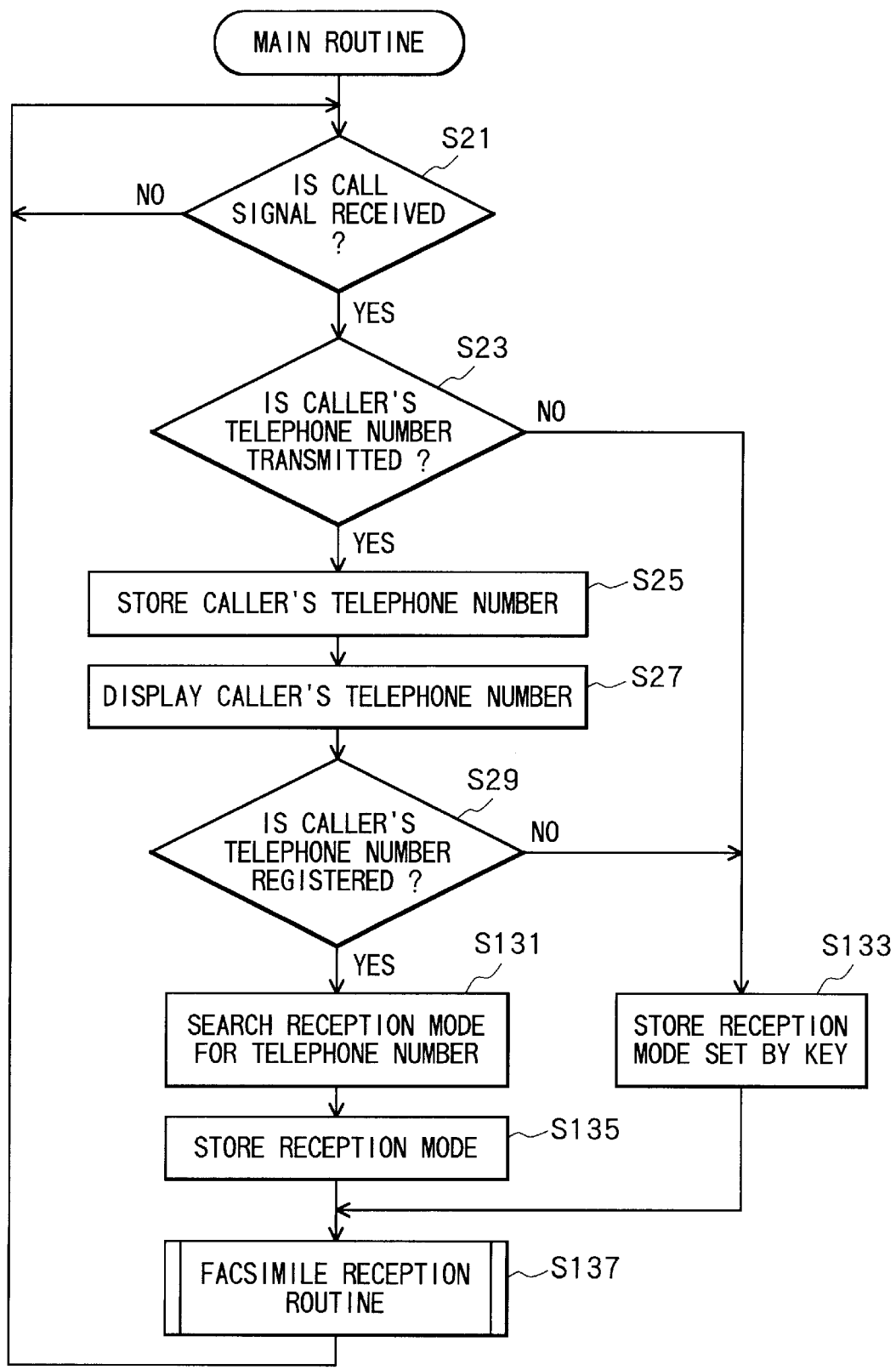
FIG. 11 is a flowchart showing the reception mode routine of FIG. 4 modified according to the second embodiment of the present invention.

Further, according to the second embodiment, S17 of the abbreviated-dialing registration routine of the first embodiment is modified as a determination step S117, as shown in FIG. 10, for determining whether or not a reception mode most appropriate to a subject telephone number has been inputted. Also, S31 and on of the reception routine in the first embodiment are modified into S131 and on as shown in FIG. 11.

As described in the first embodiment, a reception mode setting key is provided to the operation panel 11. In the second embodiment, an operator can use the reception mode setting key to set the present facsimile machine 1 to one of three setting modes: a personal-computer reception mode; a personal-computer priority mode; and a present-device reception mode.

Although the personal-computer reception mode and the personal-computer priority mode are both modes wherein incoming image data is transmitted to the personal computer 31, they differ in processes they perform during periods when the personal computer 31 is not yet started up, that is, when its power is off. When in the personal-computer reception mode, present facsimile machine 1 will store incoming image data in its image memory 10 unless the personal computer 31 is turned on. Afterward, the present facsimile machine 1 will periodically check whether the personal computer 31 has been turned on. Once the personal computer 31 has been turned on, the present facsimile machine 1 will transmit the image data to the personal computer 31. On the other hand, when the present facsimile machine 1 is in the personal-computer priority mode, and unless the personal computer 31 is turned on, the present facsimile machine 1 will output the incoming image data to the printer portion 15 and print it on a recording sheet. The personal-computer reception mode and the personal-computer priority mode both form external reception modes. When in the present-device reception mode, the present facsimile machine 1 receives the incoming image data and prints it on a recording sheet with the printing portion 15.

Figure 9:
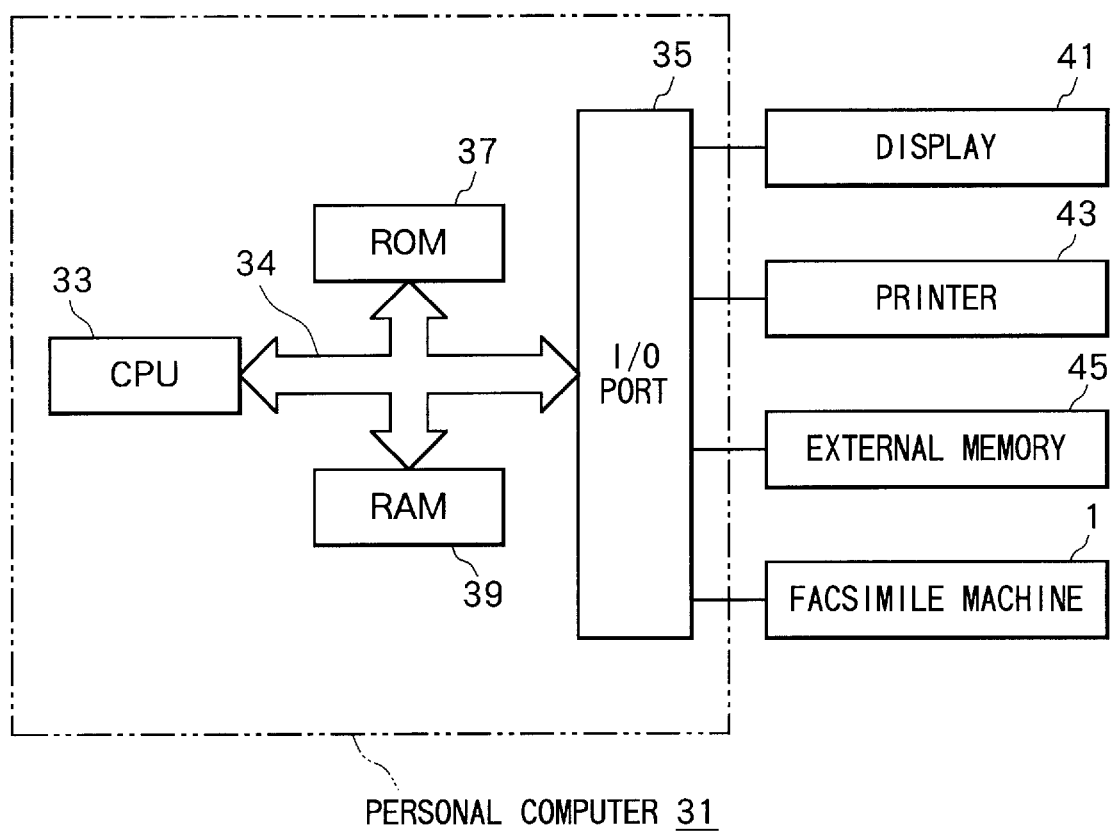
FIG. 9 is a block diagram showing components of a personal computer connected to the present facsimile machine of the second embodiment.

FIG. 9 shows the configuration of components in the personal computer 31, which serves as an external reception device or information processor. The personal computer 31 includes a CPU 33 for controlling connections to various devices; a ROM 37 for storing various control programs; a RAM 39 for temporarily storing image data and various data during execution of operations; and an input-output port 35 capable of inputting and outputting signals. All these components of the personal computer 31 are interconnected by a signal bus line 34. Various devices are connected to the input-output port 35 of the personal computer 31. For example, a display 41 for displaying image data, a printer 43 for printing image data, an external memory 43 for storing and retrieving data, and the present facsimile machine 1 are connected to the input-output port 35. When turned on, the personal computer 31 is capable of receiving coded image data transmitted from the present facsimile machine 1.

Next, an explanation of the abbreviated-dialing registration routine of the second embodiment will be provided while referring to the flowchart of FIG. 10. However, explanations will be omitted for S11 through S15 because processes performed in these steps are the same in both the first and second embodiments. After inputting a name (S15:YES), the operator preparing the abbreviated-dialing list inputs either the personal-computer reception mode, the personal-computer priority mode, or the present-device reception mode (S117). The operator determines which of the three reception modes is most appropriate for the subject telephone number based on his or her experiences with transmissions from the subject telephone number. For example, when the user of the subject telephone number usually transmits image information and the receiver usually processes that image information, then the receiver should input either the personal-computer reception mode or the personal-computer priority mode. However, the receiver should input the present-device reception mode when he or she usually does not process image data from the subject telephone number.

When a reception mode is inputted for the subject telephone number (S117:YES), then the telephone number, the name, and the reception mode are stored, in correspondence with the abbreviation number, in the abbreviated-dialing list provided at the predetermined region of the EEPROM 8 (S19). Then processes for registering abbreviated-dialing telephone numbers are completed, whereupon the abbreviated-dialing list will appear as exemplified in Table 1.

TABLE 1

| Abbreviated-Dialing Number | Telephone Number | Name of User | Reception Mode |
|---|---|---|---|
| 001 | 1111122222 | Suzuki | Personal-Computer Reception Mode |
| 002 | 3333344444 | Nakamura | Present-Device Reception Mode |
| 003 | 5555566666 | Sato | Personal-Computer Priority Mode |
| 004 | 7777788888 | Hayashi | Personal-Computer Priority Mode |
| 005 | 9999900000 | Ito | Present-Device Reception Mode |

Next, an explanation of the reception routine according to the second embodiment will be provided while referring to the flowchart of FIG. 11. However, explanations will be omitted for S21 through S29 because processes performed in these steps are the same in both the first and second embodiments. It should be noted, however, that a positive determination in S21 (S21:YES) results in caller's telephone number memory 9a of the RAM 9 being cleared.

In S23, when no caller's telephone number is transmitted with an incoming signal (S23:NO), then the reception mode stored in the reception mode memory 9b, that is, the reception mode set by the operator manipulating the reception mode setting key, is stored in the process mode memory 9c (S133). Then, facsimile-message reception processes (to be described later) are performed (S137).

In S29, when the telephone number transmitted from the remote facsimile machine 19 has not been registered in the abbreviated-dialing list (S29:NO), then the reception mode stored in the reception mode memory 9b, that is, the reception mode set by the operator manipulating the reception mode setting key, is stored in the process mode memory 9c (S133). Then, facsimile reception processes are executed (S137). On the other hand, when the telephone number has been registered in the abbreviated-dialing list (S29:YES), then the abbreviated-dialing list is searched to find the reception mode stored in correspondence with the subject telephone number (S131). Then, the found reception mode is stored in the process mode memory 9c of the RAM (S135). Then, the facsimile reception processes are performed (S137). After the facsimile reception processes are executed in S137, the program returns to S21, where reception of further incoming call signal is awaited.

Figure 12:
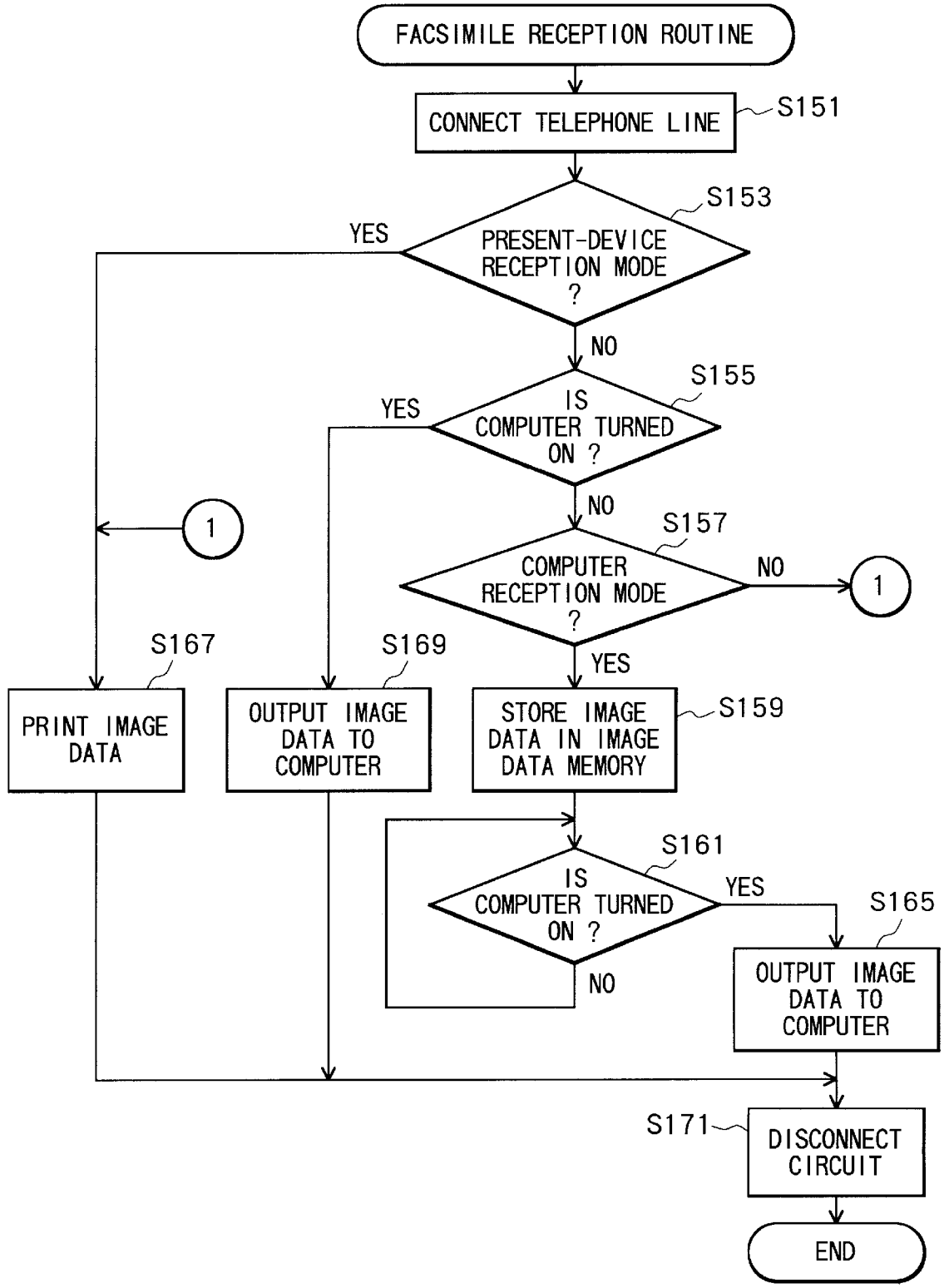
FIG. 12 is a flowchart showing the facsimile reception routine in FIG. 11 according to the second embodiment of the present invention.

Next, an explanation of the facsimile reception processes conducted in S137 of the flowchart in FIG. 11 will be provided while referring to the flowchart of FIG. 12. When the facsimile reception processes of S137 are started, first the telephone circuit 16a is closed or connected (S151). That is, the NCU 2 is controlled to close the telephone circuit 16a so that the facsimile machine 1 is properly connected to the remote facsimile machine 19. Then, whether or not the reception mode stored in the process mode memory 9c of the RAM 9 is set to the present-device reception mode is determined (S153). If so (S53:YES), the image data, which was transmitted in coded format and according to the predetermined transmission controlling procedures, is temporarily stored in the buffer 6. The image data is then serially decoded (decompressed) in the decoding portion 14. It is then developed into bit image data for recording in single-page units, stored in the image memory 10, and then outputted to the printer 15 where it is printed onto a recording sheet (S167). These processes conducted in S167 are the same as those conducted in S53 and S71 of the first embodiment. Afterward, the telephone circuit 16a is opened or disconnected (S171), which completes the facsimile reception processes.

On the other hand, if the reception mode stored in the process mode memory 9c is not the present-device reception mode, and is either the personal-computer reception mode or the personal-computer priority mode (S153:NO), then whether or not the personal computer 31 is turned on, that is, whether or not the personal computer 31 can receive coded image data transmitted from the present facsimile machine 1, is determined (S155). If the personal computer 31 is turned on (S155:YES), then the coded image data that was transmitted according to the predetermined transmission controlling procedures is temporarily stored in the buffer 6. Next, the image data is serially outputted to the personal computer 31 from the input-output port 120 (S169). The image data outputted to the personal computer 31 is stored in the RAM 39 of the personal computer 31. Afterward, the telephone circuit 16a is opened or disconnected (S171), which completes facsimile reception processes.

When the personal computer 31 is not turned on (S155:NO), then whether or not the reception mode stored in the process mode memory 9c is the personal-computer reception mode is determined (S157). If so (S157:YES), then the coded image data that was transmitted according to the predetermined transmission controlling procedures is temporarily stored in the buffer 6. Next, the coded image data is serially stored in a predetermined region of the image memory 10 (S159). Next, whether or not the personal computer 31 is turned on is determined (S161). If not (S161:NO), the program repeatedly returns to S161 until the personal computer 31 is turned on (S161:YES), whereupon the image data stored in the predetermined region of the image memory 10 is outputted from the input-output port 120 to the personal computer 31 (S165). Afterward, the telephone circuit 16a is opened or disconnected (S171), which completes the facsimile reception processes. It should be noted that the processes of S161 can be designed in the form of an interrupt routine, in which case the processes of S161 can be executed when other processes are not.

When the reception mode stored in the process mode memory 9c is the personal-computer priority mode and not the personal-computer reception mode (S157:NO), then the program proceeds to S167, where the coded image data that was transmitted according to the predetermined transmission controlling procedures is temporarily stored in the buffer 6. Next, the coded image data is serially decoded (decompressed) in the decoding portion 14. It is then developed into bit image data for recording in single-page units, stored in the image memory 10, and then outputted to the printer 15 where it is printed onto a recording sheet (S167). Afterward, the telephone circuit 16a is opened or disconnected (S171), which completes the facsimile reception processes.

In S165 and S169, because the image data is outputted to the personal computer 31 in coded form, processes are performed on the image data after being decoded in the computer 31. The decoded image data can be processed in many ways, such as by defining certain portions displayed on the display and then printing out those portions using the printer 43. Also, the image data could be entered, as image data, into a text being processed in a word processor.

As described above, in the present embodiment, when a call signal is received (Yes in S21), the caller's telephone number transmitted from the switchboard is compared with telephone numbers stored in the abbreviated-dialing list in S29. When the caller's telephone number matches one of the telephone numbers stored in the list (Yes in S29), regardless of whether any reception mode is previously set in the facsimile machine 1, a reception mode stored in the list in correspondence with the caller's telephone number is selected and performed in S131 and S137. On the other hand, if the list does not store the caller's telephone number (No in S29), the reception mode previously set in the facsimile machine 1 is performed in S133 and S137. Thus, when the caller's telephone number is registered in the abbreviated-dialing list, processes are performed according to the reception mode stored in the abbreviated-dialing list. Therefore, the operator does not need to operate the reception-mode setting key each time an incoming message is to be received using a different mode.

Also, if the operator preregisters telephone numbers and reception modes according to his or her personal needs, then incoming image information will be processed in the manner he or she desires.

Further, when reception processes are performed according to the personal-computer reception mode or the personal-computer priority mode, the personal computer 31 receives incoming image information without the need for performing special operations to the personal computer 31 for inputting data. Also, incoming image information can be processed into variety of forms using different application software.

It is conceivable to set the reception mode of the facsimile machine according to telephone number information included in a TSI signal obtained during the predetermined transmission controlling procedures, instead of according to the caller's telephone number obtained between successive call signals. However, TSI signals are optional signals transmitted by registering, in the facsimile machine, the telephone number of the facsimile terminal. Therefore, in some instances information on telephone numbers can not be obtained from TSI signals. Also, when the telephone number of the facsimile machine is changed, but the user does not preregister the new number in the facsimile machine, then TSI signals will incorrectly provide information of the previous telephone number to remote facsimile machines. For example, there is a possibility that the telephone number information in the TSI signal will remain for the previous telephone number even after the telephone number has been changed. According to the present invention, because the caller's telephone number is transmitted as a signal from the switchboard, the switchboard can properly change the signal when the caller's telephone number changes. This information is therefore more reliable than TSI signals. Accordingly, in the present embodiment, the reception mode is selected based on the caller's telephone number.

The present embodiment can be applied for setting reception modes other than the personal-computer reception mode, the personal-computer priority mode, and the present-device reception mode. For example, the present invention can be applied for setting a setting-device dependent mode, wherein the reception mode is set according to the reception-mode setting key of the present facsimile machine 1.

As described above, according to the second embodiment, the reception mode is set based on the caller's telephone number. Reception processes are performed according to the set reception mode. An operator need not set the reception mode each time he or she desires to receive incoming messages in a different form. The caller's telephone number, which is transmitted from the switchboard, is collated with a corresponding telephone number stored in the memory. Then the facsimile machine is set to a reception mode stored in correspondence with the corresponding telephone number. Therefore, if the operator preregisters each telephone number in correspondence with the reception mode most likely to suit his or her personal needs for that telephone number, then incoming image information will be processed in the manner he or she desires.

The external reception device is an information processing device capable of processing the received image information. Therefore, when the image information is to be received in the external reception mode, the incoming image information can be processed in various forms according to the functions of the information processing device.

While the invention has been described in detail with reference to specific embodiments thereof, it would be apparent to those skilled in the art that various changes and modifications may be made therein without departing from the spirit of the invention, the scope of which is defined by the attached claims.

What is claimed is:

1. A facsimile machine for receiving image information transmitted from a remote facsimile machine in a plurality of reception modes, the facsimile machine comprising:

memory means for storing an abbreviated dialing list which stores at least one telephone number, an abbreviated dialing number, and a reception mode in correspondence with one another, the reception mode being one of a plurality of reception modes;

telephone information receiving means for receiving telephone number information of a remote calling party;

reception mode setting means for, based on the calling party's telephone number information, selectively setting a reception mode from the plurality of reception modes, the reception mode setting means including means for collating the received calling party's telephone number information and the at least one telephone number stored in the abbreviated-dialing list and means for selectively setting a reception mode according to the reception mode stored in the abbreviated-dialing list in correspondence with one of the at least one telephone number that matches the calling party's telephone number information; and process execution means for executing reception processes according to the reception mode set by the reception mode setting means.

2. A facsimile machine as claimed in claim 1, wherein the telephone information receiving means receives a signal, indicative of the calling party's telephone number, from a switchboard connected to the telephone information receiving means.

3. A facsimile machine as claimed in claim 2, wherein the telephone information receiving means receives the calling party's telephone number signal during an interval between a call signal and a subsequent call signal.

4. A facsimile machine as claimed in claim 3, wherein the telephone information receiving means includes network controlling means for closing a telephone circuit connected to the switchboard after the reception mode setting means sets the reception mode corresponding to the calling party's telephone number.

5. A facsimile machine as claimed in claim 2, wherein the telephone information receiving means receives the calling party's telephone number signal before a call signal.

6. A facsimile machine as claimed in claim 4, wherein the plurality of reception modes include a telephone reception mode for receiving a telephone message and a facsimile reception mode for receiving a facsimile message, the reception mode setting means selecting, based on the calling party's telephone number signal transmitted from the switchboard, one of the telephone reception mode and the facsimile reception mode.

7. A facsimile machine as claimed in claim 6,
wherein the abbreviated-dialing list stores at least one telephone number as a facsimile message source,
the collating means determining whether or not the calling party's telephone number information transmitted from the switchboard matches one of the at least one telephone number stored in the abbreviated-dialing list,
the setting means selecting a facsimile reception mode when the collating means determines that the calling party's telephone number information transmitted from the switchboard matches one of the at least one telephone number stored in the abbreviated-dialing list as the facsimile message source.

8. A facsimile machine as claimed in claim 4,
wherein the abbreviated dialing list stores at least one telephone number as a telephone message source,
the collating means determining whether or not the calling party's telephone number information transmitted from the switchboard matches one of the at least one telephone number stored in the abbreviated-dialing list,
the setting means selecting a telephone reception mode when the collating means determines that the calling party's telephone number information transmitted from the switchboard matches one of the at least one telephone number stored in the abbreviated-dialing list as the telephone message source.

9. A facsimile machine as claimed in claim 4, further comprising:
message processing means for processing a message received from the remote facsimile machine; and
connection means for being connected to an external reception device,
wherein the plurality of reception modes include an external reception mode for further transmitting, via the connection means, the received message toward the external reception device and a present-device reception mode for transferring the received message to the message processing means to be processed thereby, the reception mode selection means selecting, based on the calling party's telephone number, one of the external reception mode and the present-device reception mode.

10. A facsimile machine as claimed in claim 9, wherein the external reception device includes an information processing device capable of processing received message representative of image information.

11. A facsimile machine capable of receiving a caller's telephone number transmitted, from a switchboard, either directly before transmission of a first call signal or between transmission of a call signal and transmission of a subsequent call signal, the facsimile machine comprising:

memory means for storing an abbreviated dialing list which stores at least one telephone number, an abbreviated-dialing number, and a reception mode in correspondence with one another, the reception mode being one of a telephone reception mode and a facsimile reception mode;

mode selection means for selecting, based on the caller's telephone number transmitted from the switchboard, one of the telephone reception mode and the facsimile reception mode, the mode selection means including means for collating the transmitted caller's telephone number and the at least one telephone number stored in the abbreviated dialing list and means for selectively setting one of the telephone reception mode and the facsimile reception mode that is stored in the abbreviated dialing list in correspondence with one of the at least one telephone number that matches the caller's telephone number; and mode execution means for executing reception processes of the selected reception mode.

12. A facsimile machine as claimed in claim 11, wherein the abbreviated dialing list stores at least one telephone number as a telephone message source,
the collating means determining whether or not the caller's telephone number transmitted from the switchboard matches one of the at least one telephone number stored in the abbreviated dialing list,
the setting means selecting the telephone reception mode before connecting a telephone circuit when the collating means determines that the caller's telephone number transmitted from the switchboard matches one of the at least one telephone number stored in the abbreviated dialing list.

13. A facsimile machine as claimed in claim 11, wherein the abbreviated dialing list stores at least one telephone number as a facsimile message source,
the collating means determining whether or not the caller's telephone number transmitted from the switchboard matches one of the at least one telephone number stored in the abbreviated dialing list,
the setting means selecting the facsimile reception mode before connecting a telephone circuit when the collating means determines that the caller's telephone number transmitted from the switchboard matches one of the at least one telephone number stored in the abbreviated dialing list.

14. A facsimile machine connected to an external reception device for receiving image information transmitted from a remote facsimile machine and capable of receiving a caller's telephone number transmitted from a switchboard, the facsimile machine comprising:

memory means for storing an abbreviated dialing list which stores at least one telephone number, an abbreviated-dialing number, and a reception mode in correspondence therebetween, the reception mode being one of a plurality of reception modes, the plurality of reception modes including an external reception mode wherein reception is performed at an external reception device and a present-device reception mode wherein reception is performed by the facsimile machine;

a reception mode setting means for, based on the caller's telephone number transmitted from the switchboard, selectively setting a reception mode from the plurality of reception modes, the reception mode setting means including means for collating the transmitted caller's telephone number and the at least one telephone number stored in the abbreviated-dialing list and means for selectively setting a reception mode that is stored in the abbreviated-dialing list in correspondence with one of the at least one telephone number that matches the caller's telephone number; and a process execution means for executing reception processes according to the reception mode set by the reception mode setting means.

15. A facsimile machine as claimed in claim 14, wherein the external reception device includes an information processing device capable of processing received image information.

16. A facsimile machine as claimed in claim 14, wherein the process execution means includes:

reception means for receiving image information transmitted from the caller's facsimile machine;

judging means for judging whether or not the external reception device is in a condition capable of receiving the image information when the reception mode setting means sets the external reception mode;

outputting means for outputting the received image information to the external reception device when the external reception device is judged to be in a condition capable of receiving the image information; and temporary storage means for temporarily storing the received image information until the external reception device becomes capable of receiving the image information when the external reception device is judged not to be in the condition capable of receiving the image information.

17. A facsimile machine as claimed in claim 16, wherein the process execution means further includes print means for printing out the image information when the reception mode setting means sets the present-device reception mode.

18. A facsimile machine as claimed in claim 17, wherein the plurality of reception modes further include an external reception priority mode, and wherein the judging means judges whether or not the external reception device is in the condition capable of receiving the image information when the reception mode setting means sets the external priority mode, the outputting means outputting the received image information to the external reception device when the external reception device is judged to be in the condition capable of receiving the image information, the print means printing out the image information when the external reception device is judged not to be in the condition capable of receiving the image information.

* * * * *